UNITED STATES PATENT OFFICE.

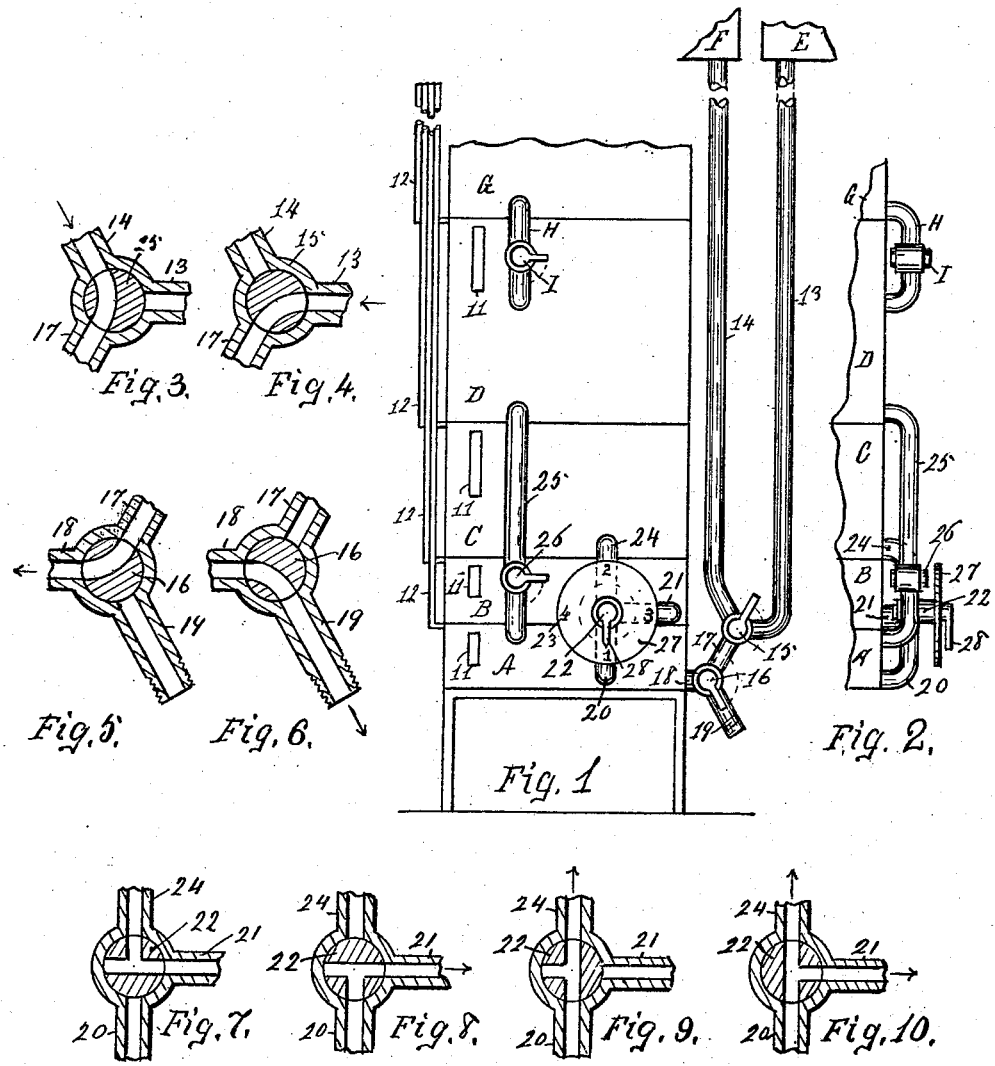

JOHN E. BOURNE, OF SOMERVILLE, OHIO.

OIL-DISPENSING TANK.

No. 842,517.  Specification of Letters Patent.  Patented Jan. 29, 1907.

Application filed December 29, 1905. Serial No. 293,765.

*To all whom it may concern:*

Be it known that I, JOHN E. BOURNE, a citizen of the United States, residing at Somerville, Butler county, Ohio, have invented a new and useful Improvement in Oil-Dispensing Tanks, of which the following is a specification.

My invention relates to oil-dispensing tanks of the class adapted to use for hydrocarbons or other liquids; and the objects of my improvement are to provide a series of superposed measuring vessels consisting of units and aliquot parts thereof, to provide valved connections between the storage vessel and the common bottom measure, to provide independent valved connections between the bottom measure and the superposed measures, to provide independent vent-pipes for the measures, and glass gages to indicate the contents of the respective measures. These objects are obtained in the following-described manner, as illustrated in the accompanying drawings, in which—

Figure 1 is a front elevation of a series of superposed dispensing-tanks embodying my improvement; Fig. 2, a side elevation with parts broken away; and Figs. 3 to 10, inclusive, sectional diagrams, showing the different positions of the valves or cocks.

In the drawings, A, B, C, and D represent measuring vessels of any desired form and preferably superposed in the order mentioned. Vessel D represents the unit of measure, as one gallon. Vessel C is one-half the size and vessels B and A are each one-fourth the size of vessel D. Said vessels may consist of different apartments separated by partitions formed in the same tank. Each vessel is provided with a glass-covered slot 11 to indicate the contents therein and with an open vent-tube 12, which terminates above the level of the oil in the storage-tanks E and F. Pipes 13 and 14 lead from the said storage-tanks through three-way cocks 15 and 16 and through pipes 17 and 18 to the interior of vessel A or through discharge-nozzle 19. From the vessel A the oil may be distributed through pipes 20 and 21, provided with a T-valve 22, which also controls pipe 24, leading to vessel C and to vessel D, through pipe 25, provided with straightway cock 26. Stationary disk 27 is provided with characters 23 to indicate the different operative positions of the valve-handle 28. Additional unit-measures G may be superposed above vessel D and successively connected together by means of respective pipes H, each provided with a straightway cock I.

In operation valve 22 is turned, as shown in Figs. 1 and 7, to close pipe 20. Valve 16 is turned, as shown in Fig. 5, to open pipes 17 and 18 and close nozzle 19. Valve 15 is turned, as shown in Fig. 4, to open pipes 17 and 13 to the supply-tank E. This permits one quart, as indicated on the disk in Fig. 1, to be measured by vessel A and then to be discharged through nozzle 19 by turning valve 16 to close pipe 17 and open said nozzle, as shown in Fig. 6. To measure two quarts, valve 22 should be turned, as shown in Fig. 8, to open pipes 20 and 21 and close pipe 24, which will permit the filling of measure B in addition to measure A. To measure three quarts, valve 22 should be turned, as shown in Fig. 9, to open pipes 20 and 24 to measure C and close pipe 21 to measure B. To measure four quarts or one full unit, valve 22 should be turned, as shown in Fig. 10, to open pipe 20, together with pipes 21 and 24, leading, respectively, to measures B and C from measure A. Full units may be added to any number of aliquot parts by opening the corresponding number of pipes 25 or H, leading therefrom to measure A. To draw from container F instead of from E, turn valve 15, as shown in Fig. 3, to open pipes 14 and 17 and close pipe 13. The area of the corresponding vent-tubes should be included in the capacity of the respective measures. Said tubes permit the escape of the air during the filling of the measures and prevent the forming of vacuums during the emptying of the contents therefrom. The containers may be supplied with different kinds of liquids, as with kerosene and gasolene. When not in use, the measures remain empty, that there may be no leakage therefrom. The operator may adjust the valves to measure the desired amount and then attend other duties without danger of overflowing the measures, which may be emptied of the measured quantity as convenient.

Having fully described my improvement, what I claim as my invention, and desire to secure by Letters Patent of the United States, is—

1. In a liquid-dispensing device, the combination of a tank, a vessel representing the unit of measure, vessels representing respectively aliquot parts thereof, one of the said latter vessels being interposed in the line of communication between the tank and said other vessels and provided with a valved discharge-pipe, and also with a valved supply-pipe leading thereto, from the tank, and valved passages leading from said latter vessel to the respective other vessels.

2. The combination of a first vessel representing one-fourth of the unit of measure and provided with a valved discharge-opening and with a valved supply-pipe, a second vessel of equal capacity, a third vessel with capacity equal to both the first and the second vessels, pipes arranged to lead from each of said vessels to both of the other vessels and a single cock arranged to control said last-named pipes as desired.

3. The combination of a series of measuring vessels one of said vessels being provided with a valved discharge-pipe and with a valved supply-pipe, passages leading therefrom to said other vessels, and means for controlling said passages either successively or simultaneously.

JOHN E. BOURNE.

Witnesses:
JAMES G. CARR,
R. S. CARR.